3,162,781
MAGNETOHYDRODYNAMIC GENERATOR
Sterling Beckwith and Don B. Smith, both of
P.O. Box 752, Lake Forest, Ill.
Filed Mar. 22, 1961, Ser. No. 97,660
22 Claims. (Cl. 310—11)

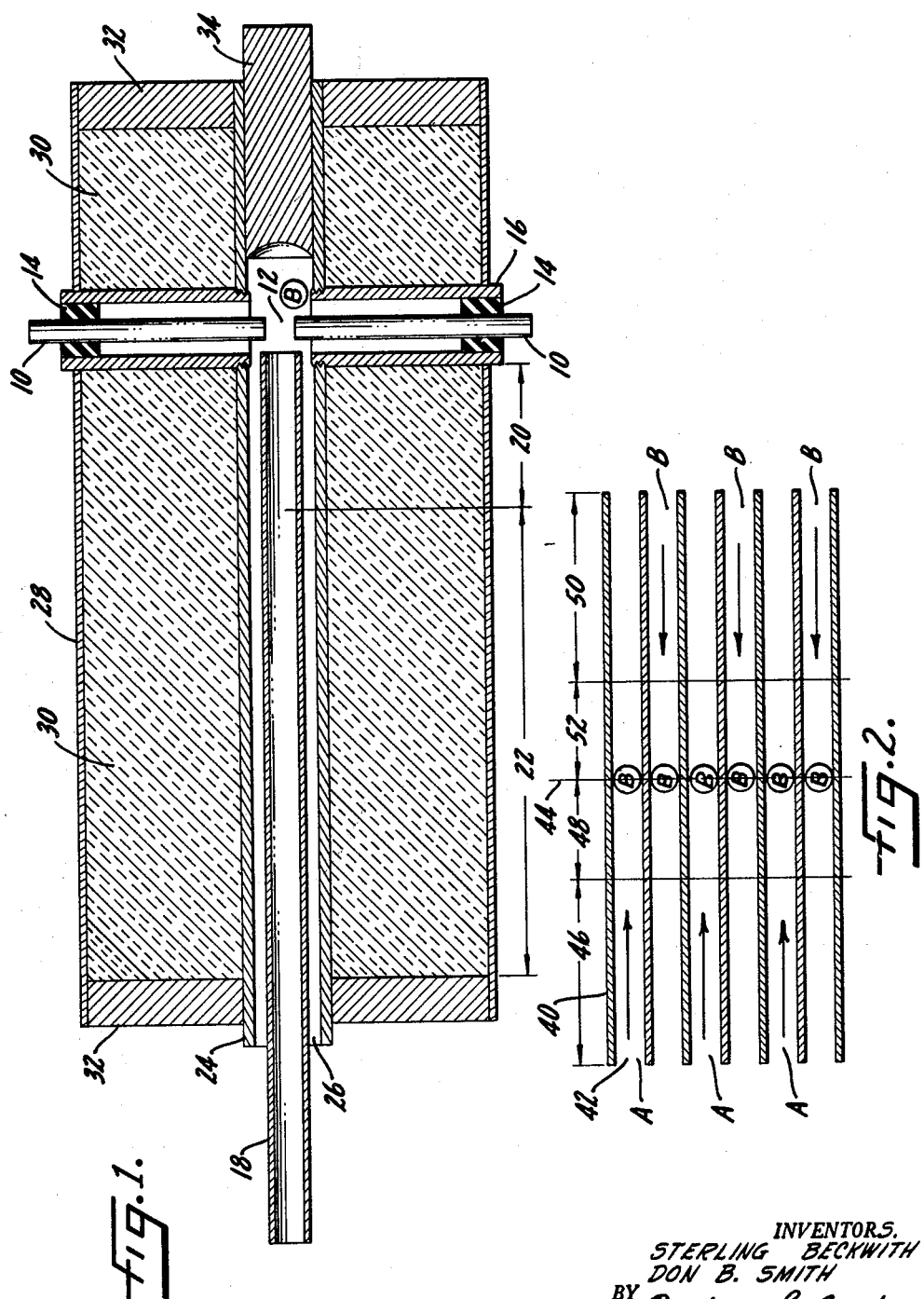

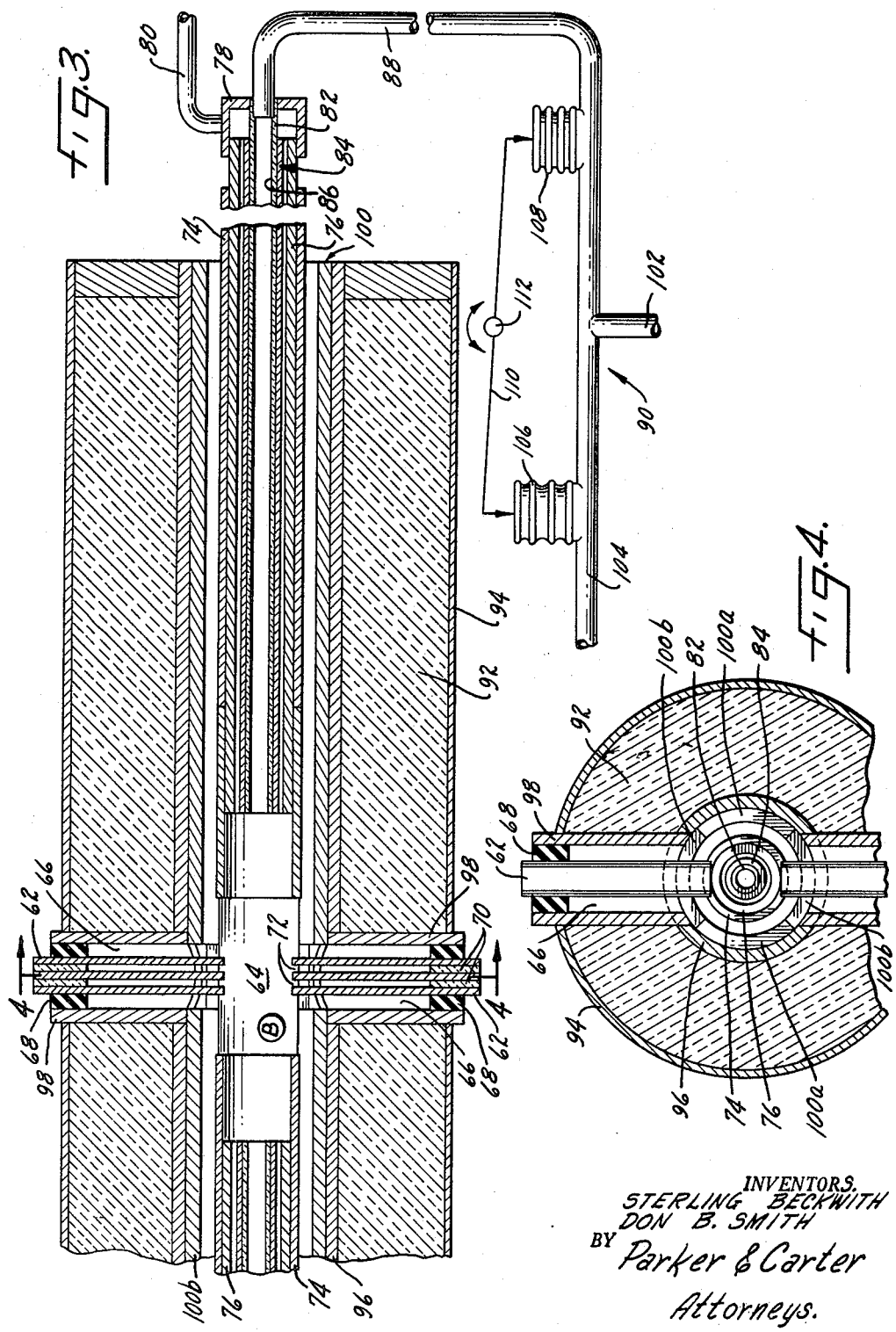

This invention relates to improvements in magnetohydrodynamic generators.

One purpose of the present invention is to provide a magnetohydrodynamic generator having means integral with the generator for pre-heating the fuel and air or fuel-air mixture prior to combustion.

Another purpose is a magnetohydrodynamic generator which has low energy loss.

Another purpose is a magnetohydrodynamic generator which can be operated to provide either a D.C. voltage or an A.C. voltage.

Another purpose is a magnetohydrodynamic generator including a tube of carbon or graphite which is effective to provide a passage for the combustible fuel or fuel mixture and can be used in burning said fuel.

Another purpose is a magnetohydrodynamic generator which operates at lower initial gas pressures than used heretofore.

Another purpose is to provide continuously or intermittently advancing expendable or consumable furnace members which may provide part or all of the fuel requirements and still serve as a liner or heat exchange surface.

Another purpose is to provide a magnetohydrodynamic generator which recirculates some of the products of combuston, thereby adding to the mass flow through the magnetohydrodynamic nozzle without adding to the BTU release, thus providing a cycle in which the stack temperature is low without the use of a partial steam cycle or other means of reducing stack temperature. By recirculating the combustion products, a greater efficiency is obtained.

Another purpose is to provide a magnetohydrodynamic generator in which a seed material is introduced as a component mixed with the consumable electrode or liner.

Other purposes will appear in the ensuing specification, drawings and claims.

The invention is illustrated diagrammatically in the following drawings wherein:

FIGURE 1 is an axial section through one form of magnetohydrodynamic generator embodying the principles disclosed herein, FIGURE 2 is a vertical section through a variant form of magnetohydrodynamic generator.

FIGURE 3 is an axial section of yet a further form of magnetohydrodynamic generator embodying the principles disclosed herein, and FIGURE 4 is a partial section along plane 4—4 of FIGURE 3.

Briefly stated, a magnetohydrodynamic generator develops an E.M.F. by passing an ionized conducting gas at a high temperature and velocity through a magnetic field in a direction perpendicular to the field. The voltage developed is determined by the flux density of the magnetic field, the velocity of the gas and the distance between electrodes. The current developed depends on the resistance between electrodes which is related to the type of gas, spacing and temperature of the gas.

In FIGURE 1, the magnetic field through which the ionized conducting gas passes extends in a direction perpendicular to the page, and accordingly is not illustrated. Any suitable electromagnet or permanent magnet may be used to form a magnetic field. A pair of electrodes 10 have their ends positioned in the magnetic field, the field being directed through the center of the generator at the area designated generally at 12. The electrodes may be formed of carbon or some other suitable material. Each of the electrodes may be supported by an insulating sleeve 14 which may be rubber or a rubber substitute suitable for withstanding high temperatures, each sleeve in turn being mounted in a carbon tube or the like 16. It may be said at this point that many of the parts of the magnetohydrodynamic generator of this invention are formed of carbon or of graphite, a form of carbon. When used herein the term carbon includes graphite or other suitable forms of carbon. Carbon has a high melting point, and although it may oxidize below its melting point, this presents no problem. The carbon is expendable as used herein. Most units of this general type have sought a housing material which has a long life when subjected to the high temperatures present. Such materials are generally unsatisfactory. We prefer to use an expendable material, such as carbon.

A carbon tube or rod 18, which is the fuel or gas input tube, directs a combustible mixture of gas, for example, 4 percent propane and 96 percent air, toward the magnetic field area 12. Although a mixture is mentioned, the fuel and air may be separately supplied to the combustion zone. That portion of the tube 18 which extends into the magnetohydrodynamic generator may be divided into a combustion zone 20 and a pre-heating zone 22. The incoming gaseous mixture, which may initially have a low velocity and be at room temperature, is fed in through the tube 18 where it is pre-heated and finally burned in the combustion zone 20. The means for burning are not illustrated herein but may be any conventional furnace arrangement, or an oxygen-acetylene torch.

Concentric with and surrounding the tube 18 is a second carbon sleeve or tube 24. In operation, the exhaust gases from the burning zone 20 pass around the tube 18 and flow outwardly between the tubes 18 and 24, the exhaust gases finally flowing to the surrounding atmosphere through opening 26 between the tubes. The flow of exhaust gases outwardly along tube 18 provides the means for pre-heating the combustible mixture flowing inwardly through this tube. Initially, the exhaust gases, as they leave the combustion zone, will be at a very high temperature; however, as they move toward the left in FIGURE 1 or toward the outside they will gradually decrease in temperature and the heat given up will be taken on by the incoming gas flowing through the tube 18.

As an illustration of the temperatures which may be used in this unit, the combustion zone may be at a temperature 5,000 degrees F. and the temperature of the exhaust gas will be approximately 850 degrees F. at opening 26. The outer shell of the unit will be at approximately 300 degrees F. which is a satisfactory temperature as regards most metals. In this connection, the outer shell of the unit is designated at 28 and may be any one of a number of high temperature metals. An annulus of insulation 30, which is preferably carbon dust or carbon particles, separates the outer shell from the combustion zone and pre-heating zone. The carbon dust is particularly satisfactory as insulation in that it forms its own inert atmosphere and hence will not oxidize. End caps 32 complete the outer structure. We may place a carbon plug or the like 34 opposing the rod 18 to further define the zone 12.

As a specific example of the unit illustrated in FIGURE 1, we may provide a carbon rod 18 with a one-half inch inner diameter. Using a mixture of 4 percent propane and 96 percent air as fuel and giving this gaseous mixture an initial velocity of 100 feet per second, the gas will assume a velocity of 1,000 per second when it is hot and will have a velocity approximately Mach 1 as it passes through the magnetic field. That is, when the ionized conducting gas passes through the magnetic field. Generally about 5 percent of the input energy is lost in the carbon insulation and another 26 percent of the input energy is lost through the exhaust gas. Accordingly, approximately 70 percent of the input energy is available to develop an electric potential. This is a very low energy loss for units of this type. The electrodes 10 develop a D.C. voltage, one of the electrodes being positive and the other negative. However, as will appear hereinafter, means and methods are provided for developing an A.C. voltage at these electrodes. When using a gas input as described above, and at a rate of 72 pounds of air and fuel per hour, there will be a power output of 16.4 kilowatts.

FIGURE 2 illustrates a further form of the invention. A plurality of carbon plates 40 define a number of gas passages or spaces 42. A magnetic field will be positioned such that it is generally perpendicular to the drawings, and hence extends between the plates and generally parallel to them. Preferably the field is positioned approximately at the center of the group of plates, the approximate position of the field being designated at 44. We have designated alternate spaces between plates as either A or B. In one method of operation, we may direct a combustible gaseous mixture into the spaces A from the lefthand side such that the area indicated at 46 will be a preheating zone and the area indicated at 48 will be a combustion zone, the combustion zone being adjacent the magnetic field 44. At the same time, we may introduce a combustible gaseous mixture in the spaces B from the righthand side and accordingly there will be a pre-heating zone 20 and a combustion zone 52, again adjacent the magnetic field 44. Accordingly, the direction of gas flow in adjacent spaces is opposite. We may use the exhaust gas flowing toward the right in spaces A to preheat the incoming gaseous mixture flowing in spaces B and also the exhaust from spaces B to pre-heat the gas flowing in spaces A. In other words, by having a counterflow arrangement we can utilize the exhaust gas to the fullest extent possible. Using the top space A as an example, the incoming gas will be pre-heated by the exhaust from space B below and when exhaust gas in top space A reaches the pre-heating zone 50, it in turn will preheat inflowing gas in space B.

The magnetohydrodynamic generator of FIGURE 2 may be operated to produce an A.C. voltage at the plates 40. We may pulse or otherwise alternate the flow of gas such that gas flows in spaces A during one time interval and then in spaces B during the next time interval. The time intervals should be such that the exhaust gas flowing in space A will be positioned to preheat the incoming gas in space B. The size of the unit and the frequency of the desired voltage will determine the time intervals. When utilizing that form of magnetohydrodynamic generator shown in FIGURE 2, the plates 40 alternate in potential. For example, the top plate may be positive, the next plate negative, and the plates alternating in like fashion.

FIGURE 3 illustrates a further form of magnetohydrodynamic generator. The magnetic field, as in the previously described generators, is generally perpendicular to the page and we have placed a plurality of electrodes 62, which may be two or more, with their ends opposing in a zone 64 which is within the magnetic field. As was the case with the structure of FIGURE 1, the electrodes are mounted in a well 66 and supported by an insulating sleeve 68. Preferably, the electrodes are segmented as shown to reduce losses due to the Hall effect. The cross section of a single electrode of equivalent area would be so large that there would be a power loss due to current flowing from one side of the electrode to the other in the direction of gas flow. Accordingly, each electrode segment is insulated from the adjacent segments. The electrode insulation may be a ceramic or air. As shown in FIGURE 3, there is a small ceramic layer 70 at the outer end of the electrode segments with air spaces 72 separating the inner ends.

To direct the incoming fuel and to burn it, we have an outer carbon sleeve 74 slidably mounted on an inner tube or sleeve 76 also formed of carbon, both extending outside of the furnace. The outer sleeve 74 is expendable and will be moved toward the combustion zone as it is burned up, and in some applications may form the fuel for burning. As sleeve 74 is used up, new sections are mounted outside the furnace and pushed in toward the combustion zone. A bracket or housing 78 encloses the end of tube 76 and a fuel pipe 80 directs the incoming fuel into the housing so that the fuel may flow between tube 76 and an inner tube 82.

The tube 82 may include an outer sleeve 84 of a protective material such as carbon or graphite, and an inner tube 86 of an oxide such as zirconia, alumina, or the like. The inside of sleeve 82 will accordingly withstand an oxidizing atmosphere and the outside will withstand a deoxidizing or reducing atmosphere. In this connection, the sleeves 76 and 84 may be formed of molybdenum, as it also will withstand a reducing atmosphere. In some applications the fuel inlet may be inside the air pipe. In any event, the air must always flow adjacent a ceramiclike material which will withstand an oxidizing atmosphere. The combustion zone will be that area beyond the sleeve 82 and within the sleeve 74. It should be noted that the lefthand side of FIGURE 3 illustrates a unit identical with that described above. Each unit will direct ionized conducting gas through the magnetic field.

In operation, air may flow through tube 88, which may be steel or otherwise, from a bellows-type arrangement 90 through the sleeve 86 and toward the combustion zone. The fuel to be burned flows outside of the sleeve 82 and within sleeve 74. In other words, the fuel and air mix in the combustion zone. The hot products of combustion or the exhaust flows outside of the sleeve 74 to preheat the incoming fuel and to some extent the incoming air. The exhaust gas for preheating may come from the opposite sleeve unit. In other words, the unit at the right hand side of FIGURE 3 provides exhaust gas for the unit on the left hand side, similar to the arrangement illustrated in FIGURE 2.

To provide proper insulation, we may use carbon dust or the like 92 to maintain the outer shell 94 at a suitable operating temperature. The insulation 92 may be supported by an inner carbon sleeve 96 and the electrode well sleeves 98. An expendable carbon liner 100 is slidably mounted on the sleeve 96 and surrounds the sleeves 74. The liner 100 may be divided into four quarter segments, with the segments 100a extending the full length of the generator and segments 100b stopping short of the electrodes. As mentioned above, the liner segments 100a and 100b are carbon and are expendable. These liner segments may be continuously fed into the generator as they are used up in burning.

To further describe the bellows arrangement 90, incoming air may flow through pipe 102 where it is directed through pipe 88 or pipe 104 to either the left hand or right hand unit. The bellows 106 and 108 are operated by a rod or the like 110 moving about a fulcrum or pivot 112. The rod and bellows are effective to direct air either to the left hand or right hand unit, but not to both units at the same time. Thus a pulsing type arrangement is provided whereby air for combustion will flow to one combustion zone during one time interval and to the other combustion zone during the next time interval. This will provide an A.C. voltage at the electrodes 62. This bellows arrangement is merely illustrative of one form of pulsing arrangement. Although not shown in the drawings, the fuel may also be pulsed or alternated similar to the air as above.

The generator of FIGURE 3 may also be operated to provide a D.C. voltage in which case combustion air and fuel would be simultaneously directed to each combustion zone.

One mode of operating the magnetohydrodynamic generator shown in FIGURES 3 and 4 contemplates trapping the exhaust gases and then introducing these gases into the fuel line. Such a recirculation of the exhaust gases is advantageous in that the mass flow of the burning jet of fuel and air is increased with no increase in the BTU input. The exhaust gases may have Co and carbon particles which are valuable as fuel. Greater efficiency is thus obtained by utilizing any unburned fuel in the exhaust gases.

The use, operation and function of the invention are as follows:

The magnetohydrodynamic generator is a device wherein a conducting gas is retarded by electromagnetic forces and thus gives up its energy of pressure or velocity which is converted into electrical energy because of the motion through a magnetic field. If, as is usually assumed, there is a pressure drop along the gas path, the gas must be contained within a pressurized channel. If, however, the initial pressure supply to the burner is low enough (say 5 p.s.i.g.) so that the gas is relatively incompressible, then the heated and conducting gas products of combustion leaving the burner can act as a jet (similar to the jet in an impulse type water wheel or turbine) and the bulk of its energy can be recovered from the unconfined jet merely by deceleration of its mass. In other words, the kinetic energy of the jet decreases to nearly zero as this energy is converted into electrical energy. In order to do this efficiently it is necessary that some products of combustion be recirculated so that the energy of combustion can be fully transformed to kinetic energy of the jet at the velocities possible in the reasonably incompressible flow range (i.e. below Mach 1). This reduction of energy of combustion relative to energy of mass flow in a jet at relatively incompressible pressures is one of the objects of this invention.

Of particular note in the invention is the means for preheating the fuel and air by utilizing the exhaust gas from the combustion zone. The pre-heating zone is immediately adjacent the combustion zone and within and integral with the generator. This arrangement has the advantage of exhausting the products of combustion at a low temperature while utilizing the heat from the exhaust gas to preheat the fuel and air to a suitable temperature for combustion and consequent gas ionization. Such an arrangement can permit doing away with the conventional seeding operation or the addition of a chemical such as potassium or cesium to further ionization. By using such an arrangement the operating temperature of the generator can be roughly 5,000 degrees F. or more. Normally, sufficient ionization is not possible at lower temperatures unless seeding is used.

We have found it advantageous in some applications to preheat the fuel and air as a mixture, whereas in others it is satisfactory to preheat the fuel and air separately. The latter is the preferred method.

Propane has been mentioned as a possible fuel. Other satisfactory fuels are powdered coal, hydrogen, and possibly some of the higher hydrocarbons such as fuel oil and kerosene.

It should be realized that, while not shown in the drawings, an electrodeless flat plate structure could be made utilizing the principles of FIGURE 3 just as the electrodeless flat plate structure of FIGURE 2 utilizes the principles of FIGURE 1.

A further advantage of the invention is the use of carbon as the housing for the incoming fuel mixture. By utilizing carbon in this manner, the carbon sleeve may be both a housing and fuel for burning. The carbon is expendable and in the case of tube 18 and sleeve 76 may be continuously fed toward the combustion zone. In this connection, carbon is used at all places in the generator which are adjacent the combustion zone. The electrodes may also be expandable carbon and may include a seeding material. Some of the expandable carbon sleeves may also include a seeding material.

At present coal in large boilers is usually powdered and is sometimes dried. If this powdered, dried coal is subjected to an additional step of extrusion, either remotely from the magnetohydrodynamic generator or as an integral part of the generator liner advancing mechanism, it becomes directly the carbon or graphite expendable liners or sleeves mentioned above. In this case these extrusions could supply 100 percent of the fuel requirements after initial preheat with gas or liquid fuel and could eliminate the need for a separate fuel preheating passage, thus simplifying the structure.

A further feature of the invention is the provision of a unit which will supply an A.C. voltage. By either pulsing the air and fuel mixture, as in FIGURE 2, or by pulsing the air which combines with the fuel to form a combustible mixture, as in FIGURE 3, we have provided a method of supplying an A.C. voltage.

Of particular advantage is the arrangement in FIGURES 2 and 3 in that the exhaust gases, which normally have a high velocity, will flow directly from the combustion zone through the magnetic field and then pass over the incoming fuel of the opposite unit to preheat it. This has an advantage over the arrangement of FIGURE 1 wherein the exhaust gas has to, in effect, reverse itself.

Whereas the term tube or sleeve has been used throughout the specification, this should be understood to include a hollow member of any cross section, for example, circular, rectangular, elliptical or square. In the case of FIGURE 2, the plates may be flat, curved, corrugated or the like.

Whereas the preferred form of the invention has been shown and described herein, it should be realized that there are many modifications, substitutions and alterations thereto within the scope of the following claims.

We claim:

1. In a magnetohydrodynamic generator, means for forming a magnetic field, spaced electrodes positioned in said magnetic field, a source of combustible gas, a combustion zone adjacent said magnetic field for heating said gas to a temperature sufficient to ionize it, a preheat zone adjacent said combustion zone, and a defined passage formed of a carbon material for directing said combustible gas through said preheat zone, combustion zone and to said magnetic field whereby the ionized conducting gas passing through the magnetic field produces a voltage at said electrodes, exhaust gas from said combustion zone flowing in a direction opposite that of the conducting gas along said defined passage past said preheat zone.

2. The structure of claim 1 further characterized by a plurality of adjacent and generally parallel carbon passages for directing a combustible gas toward said magnetic field, the gas in one passage moving in a direction opposite the gas in the adjacent passages so that the exhaust from said one passage is effective to pre-heat the gas in the adjacent passages.

3. The structure of claim 1 further characterized by a plurality of said defined carbon passages each directing a combustible gas toward said magnetic field, said passages being generally parallel and arranged such that exhaust from one passage pre-heats the incoming gas in another passage.

4. In a magnetohydrodynamic generator, means for forming a magnetic field, spaced electrodes positioned in said magnetic field, means for directing an ionized conducting gas through said field and in a direction perpendicular thereto to produce a voltage at said electrodes, and means for supplying said ionized gas including a source of a gaseous mixture, a carbon tube for directing said gaseous mixture toward said magnetic field, means for heating said gaseous mixture in the tube adjacent said magnetic field to produce an ionized conducting gas, a second carbon tube concentric with and surrounding said first tube, the exhaust from said combustion zone passing between said carbon tubes to pre-heat the incoming gaseous mixture.

5. The structure of claim 4 further characterized by an annulus of carbon dust or the like surrounding said carbon tubes and providing insulation therefor.

6. The structure of claim 4 further characterized in that sad carbon tubes are generally perpendicular to said magnetic field and to the generated current flow between electrodes.

7. In a magnetohydrodynamic generator, a plurality of spaced carbon plates, means for forming a magnetic field generally adjacent the center of said plates, means for directing a combustible gaseous mixture between said plates and means for heating said combustible gaseous mixture between each pair of plates and generally adjacent said magnetic field to supply an ionized conducting gas which moves through said field in a direction generally perpendicular thereto, movement of said ionized conducting gas through said magnetic field developing an electric voltage between each pair of adjacent plates, the gas in adjacent spaces moving in opposite directions toward the magnetic field, the exhaust in one space passing by the incoming gaseous mixture in the adjacent space to preheat said incoming gas.

8. The structure of claim 7 further characterized in that said magnetic field extends between said plates, the polarity of the voltage developed at each plate being opposite to that developed at the adjacent plate on either side.

9. The structure of claim 7 further characterized in that said combustible gaseous mixture alternately flows in the space between one pair of plates and then in the adjacent space.

10. In a magnetohydrodynamic generator, means for forming a magnetic field, spaced electrodes positioned in said magnetic field, means for directing an ionized conducting gas through said magnetic field and perpendicular thereto to produce a voltage at said electrodes, and means for supplying said ionized conducting gas including a source of fuel and a source of air, a tube for directing said air toward said magnetic field, said tube including an inner layer of a ceramic-like material and an outer layer of a material suitable to withstand a reducing atmosphere, a second tube of a material suitable to withstand a reducing atmosphere concentric with said first tube for supplying fuel to a combustion zone, said second tube extending beyond said first tube to define a combustion zone adjacent said magnetic field, and means for pre-heating the incoming gaseous mixture.

11. The structure of claim 10 further characterized in that fuel flows toward said combustion zone between said outer tube and said inner tube and air flows toward said combustion zone through said inner tube, said fuel and air mixing at the combustion zone, the hot exhaust gases passing alongside of and outside said outer tube to preheat the incoming fuel and air.

12. The structure of claim 11 further characterized by a plurality of units each consisting of an outer tube suitable for withstanding a reducing atmosphere and an inner tube having a ceramic-like layer and an outer layer of a material suitable for withstanding a reducing atmosphere, and means for directing fuel and air first through one of said units and then another of said units to produce an A.C. voltage at said electrodes.

13. The structure of claim 10 further characterized in that said ceramic-like layer includes zirconia, and those portions of the structure which are formed of a material suitable for withstanding a reducing atmosphere include carbon.

14. A method of developing an A.C. voltage with a magnetohydrodynamic generator of the type described including the steps of directing a combustible gas through a first one or group of defined passages to a combustion zone to be ionized and then through a magnetic field, then directing a combustible gas through a second one or group of defined passages to a second combustion zone to be ionized and then through said magnetic field, thereafter repeating the cycle at a rate consonant with the desired frequency of the output.

15. The method of claim 14 further characterized by the step of pre-heating said combustible gas prior to the flow of said mixtures into the combustion zone.

16. The method of claim 14 further characterized in that said first one or group of defined passages is generally opposite to said second one or group of defined passages.

17. A method of operating a magnetohydrodynamic generator of the type described including the steps of passing a combustible gas through a combustion zone where it is ionized and then through a magnetic field, and introducing at least a portion of the combustion products into the combustible gas, prior to burning, to thereby increase the mass flow of the combustible gas without increasing the BTU input to the generator.

18. The method of claim 17 further characterized in that the combustion products leave the combustion zone substantially as a jet.

19. In a magnetohydrodynamic generator, means for forming a magnetic field, spaced electrodes positioned in said magnetic field, passage means for directing an ionized conducting gas through said magnetic field to produce a voltage at said electrodes, means defining a combustion zone adjacent said magnetic field for heating said gas to ionize it, said passage means and the means defining said combustion zone being formed of a consumable carbon.

20. In a magnetohydrodynamic generator, means for forming a magnetic field, spaced electrodes positioned in said magnetic field, passage means for directing an ionized conducting gas through said magnetic field to produce a voltage at said electrodes, means defining a combustion zone adjacent said magnetic field for heating said gas to ionize it, said passage means and the means defining said combustion zone being formed of consumable carbon and forming the primary fuel for burning.

21. In a magnetohydrodynamic generator, means for forming a magnetic field, spaced electrodes positioned in said magnetic field, passage means for directing an ionized conducting gas through said magnetic field to produce a voltage at said electrodes, means defining a combustion zone adjacent said magnetic field for heating said gas to ionize it, said passage means and the means defining said combustion zone being formed of a heat resisting consumable material and being adapted for continuous replacement as they are consumed.

22. The structure of claim 21 further characterized in that said consumable parts are formed of powdered coal extruded under pressure.

References Cited in the file of this patent

UNITED STATES PATENTS

| 1,916,076 | Rupp | June 27, 1933 |
| 2,779,573 | Kuroda | Jan. 29, 1957 |
| 2,902,270 | Salomonsson | Sept. 1, 1959 |

FOREIGN PATENTS

| 403,291 | Italy | Apr. 13, 1943 |
| 738,511 | Great Britain | Oct. 12, 1955 |

OTHER REFERENCES

Publication: "Power," November 1959, pages 62 to 65 inclusive.